United States Patent [19]
Abbott

[11] 3,765,190
[45] Oct. 16, 1973

[54] APPARATUS FOR MAKING A FROZEN CONFECTION

[76] Inventor: Ronald L. Abbott, 2325 Panorama Dr., Deep Cove, North Vancouver, British Columbia, Canada

[22] Filed: Apr. 6, 1972

[21] Appl. No.: 241,669

[52] U.S. Cl.......................... 62/233, 62/347, 62/354
[51] Int. Cl............................. F25c 1/14, F25c 7/10
[58] Field of Search...................... 62/347, 354, 233, 62/74

[56] References Cited
UNITED STATES PATENTS

| | | | |
|---|---|---|---|
| 2,104,260 | 1/1938 | Kemp | 62/354 X |
| 2,317,624 | 4/1943 | Lindsey | 62/347 X |
| 3,228,202 | 1/1966 | Cornelius | 62/347 X |
| 2,860,490 | 11/1958 | Taylor | 62/354 X |

*Primary Examiner*—William E. Wayner
*Attorney*—Kellard A. Carter

[57] ABSTRACT

An apparatus for making a frozen confection and having a refrigerated cylinder with a piston which reciprocates therein. The piston carries a sprayer which sprays a flavoured liquid medium on the inner surface of the cylinder during movement in one direction and scrapes the resultant frozen confection from the cylinder during movement in the other direction. The sprayer is fed through a passage in the piston from an arrangement which responds to movement of the piston to discharge the flavoured liquid medium through the sprayer.

10 Claims, 1 Drawing Figure

PATENTED OCT 16 1973
3,765,190
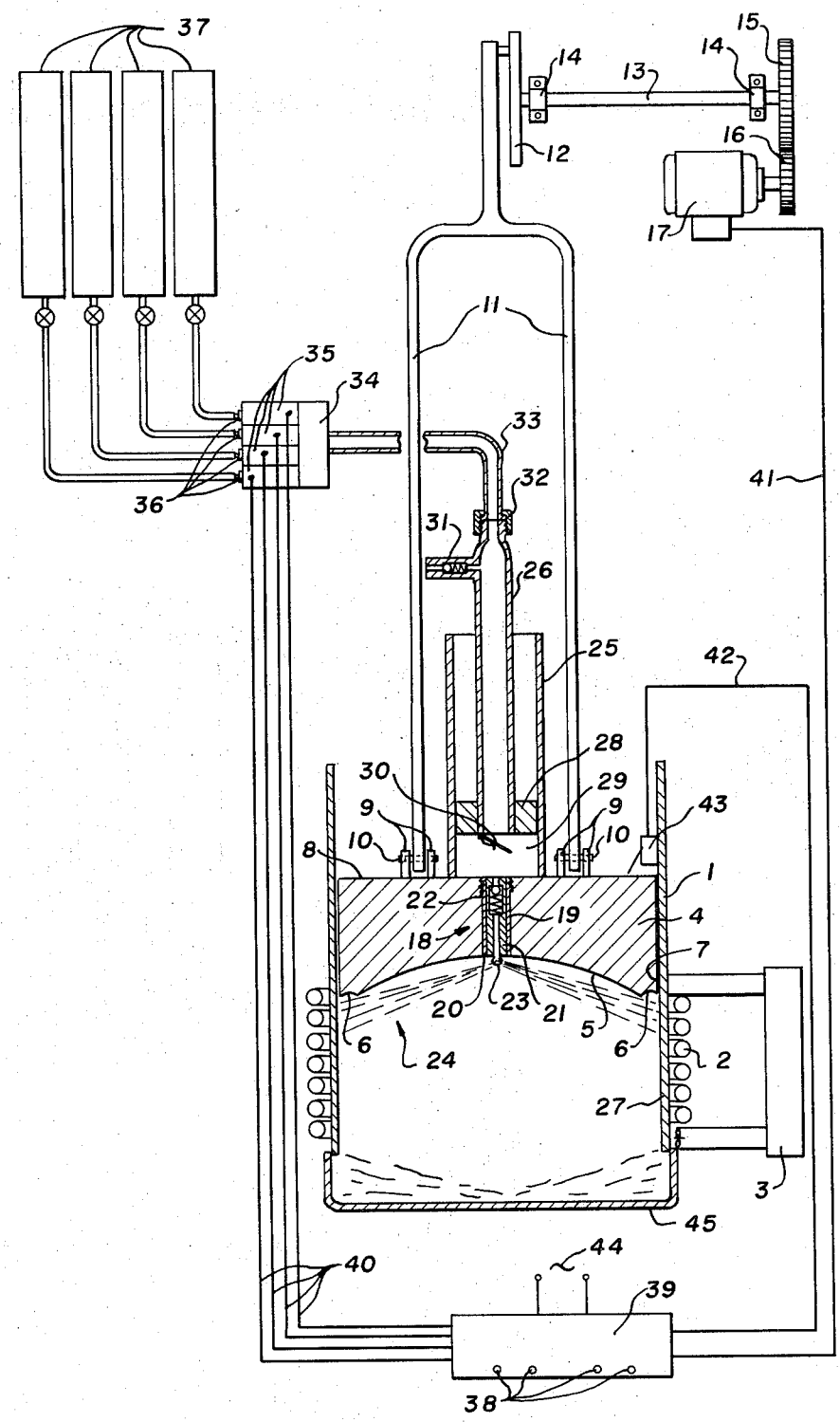

APPARATUS FOR MAKING A FROZEN CONFECTION

The invention relates to apparatus for making a frozen confection from a flavoured liquid medium.

The invention provides apparatus for making a frozen confection from a flavoured liquid medium, comprising spraying means mounted on a traveller member movable so as to reciprocate along a predetermined path, means communicating with said spraying means and responsive to the movement of the traveller member in one direction for discharging said flavoured liquid medium under pressure through said spraying means, a structure extending parallel to the path of movement of said traveller member and defining a collector surface for a layer of said liquid medium discharged as a spray by said spraying means, means for refrigerating said collector surface to convert said sprayed layer of said liquid medium into a frozen confection, and scraper means movable so as to reciprocate along said collector surface for scraping said frozen confection from the surface.

One embodiment of the invention will now be described with reference to the accompanying drawing which is a partly diagrammatic sectional elevation of an apparatus according to the invention.

Referring to the drawing, the apparatus comprises a cylinder 1, the lower portion of which is surrounded by cooling coils 2 connected to a refrigerator unit 3. A piston 4 vertically movable within the cylinder 1 has a concave lower first face 5 the periphery of which is formed with a concave annular recess 6. The outer edge 7 of the recess 6 forms a scraper edge for a purpose that will be described below. The second face 8 of the piston carries two aligned pairs of journals 9 in which gudgeon pins 10 are journalled. The gudgeon pins each have one arm of a bifurcated connecting rod 11 journalled thereon, the other end of the connecting rod 11 being pivoted to a crank disc 12. The crank disc 12 is keyed on a shaft 13 rotatable in bearings 14 and carrying at its other end a gear 15. The gear 15 meshes with the gear 16 driven by an electric motor 17. It will be evident that when the motor 17 is started vertical reciprocal motion of the piston 4 will take place within the cylinder 1.

The piston 4 is provided with an axial bore, threaded at its upper end, in which a correspondingly threaded plug 18 is engaged so as to provide a seal. The threaded plug 18 comprises an outer tube 19 carrying the thread and an inner coaxial tube 20 providing a duct through the piston. The annular space between the ducts 19 and 20 is filled with thermal insulating material 21. The tube 19 incorporates a spring loaded non-return valve 22, permitting fluid flow only in a downward direction and has a spray head 23 secured thereto at the lower end so as to project from the face 5 of the piston. The spray head 23 is adapted to produce a fine radial coniform spray, generally of the configuration shown at 24 in the drawing, so as to coat the collector surface 27 of the cylinder 1 immediately beneath the scraper edge 7 during upward movement of the piston.

A feed cylinder 25 is mounted on the surface 8 of the piston in coaxial relation to the piston and so as to surround the upper end of the tube 19. A feed tube 26 is fixed to a frame (not shown) in fixed relation to the cylinder 1. The feed tube 26 extends downwardly into the feed cylinder 25 and is formed with a piston head 28 at its lower end which engages with the walls of the cylinder 25 so as to define a feed chamber 29 of varying volume. A non return valve 30 is provided at the lower end of the feed tube 26, so as to be flush with the lower surface of the piston head 28 when closed. At the upper end, the feed tube 26 is provided with a non-return air inlet valve 31 in a side wall, the upper end of the feed tube being screw threaded for engagement with a pipe union 32. The pipe union 32 connects a delivery pipe 33 from a metering pump 34 to the feed tube 26. On its suction side, the pump 34 is connected to four suction control valves 35 whereby the pump can be arranged to selectively draw liquid through any one of these valves. The valves 35 are provided with quick release connectors 36 for connection to stock containers 37 each containing a different flavoured liquid medium.

The suction control valves 35 are each electrically operable from control buttons 38 in a programming and control unit 39 to which they are connected by electrical lines 40. The valves 35 are connected electrically in parallel to the pump 34 so that the pump is automatically started when any one of the valves 35 is actuated. The programming and control unit 39 is also electrically connected by a line 41 to the motor 17 and by a line 42 to a contact switch 43. The contact switch 43 produces a signal each time the piston 4 attains the upper limits of its movement. The programming and control unit 39 derives power from a power supply indicated at 44.

In operation, one of the selector buttons 38 is first depressed so that the valve 35 connected to one of the containers 37 is opened and the pump 34 started. The pump 34 pumps a metered quantity of the flavoured liquid medium into the feed tube 26 and automatically stops when the required amount has been supplied. The valve 35 also closes, and the programming unit 39 then starts the motor 17 which causes reciprocal movement of the piston 4. The piston 4, normally at rest in its uppermost position, starts to fall thus opening the non-return valve 30 and closing the non-return valve 22.

The partial vacuum created in the feed chamber 29 during this movement withdraws a volume of the flavoured liquid medium from the feed tube 26, the vacuum at the upper end of the feed tube 26 being relieved by air drawn in through the non-return valve 31. When the piston passes the lower limit of its movement and commences upward movement the valve 30 is closed and the valve 22 opened so that the flavoured liquid medium within the feed chamber 29 is discharged along the tube 19 and through the sprayer 23 onto the collector surface 27. Here, the flavoured liquid medium is frozen by the cooling coils 2.

After reaching the upper limit of its movement, at which time, the switch 43 provides a signal to the programming and control unit 39, the piston commences a second down stroke which again closes the valve 22 and opens the valve 30. This down stroke of the piston 4 simultaneously scrapes the resultant frozen confection from the collector surface 27 with the scraper edge 7 whilst again refilling the feed chamber 29 from the feed tube 26. The concave annular recess 6 causes the confection scraped from the collector surface 27 to be deflected downwardly for collection in a removable receptacle 45 placed beneath the cylinder 1.

The above described cycle is repeated until the feed tube 26 has been evacuated of flavored liquid medium, the number of strokes of the piston required being sensed and signalled by the contact switch 43. The final upward stroke of the piston will take place with the chamber 29 changed with air so that residual flavored liquid medium remaining in the tube 19 will be expelled. The motor 17 is then stopped by the programming unit when the piston 4 is in its uppermost position.

I claim:

1. Apparatus for making a frozen confection from a flavoured liquid medium, comprising spraying means and a scraper means, both fixedly secured to a reciprocable traveller member for reciprocating movement together therewith along a predetermined path, pressure means for delivering flavoured liquid under pressure to said spraying means, said pressure means being operable by a force generated by each movement of the traveller member in one direction along said path for discharging said flavoured liquid medium under pressure through said spraying means, a structure defining a collector surface for a layer of said liquid medium discharged as a spray by said spraying means, said collector surface extending parallel to the path of movement of said traveller member, means for refrigerating said collector surface to convert said sprayed layer of liquid medium into a frozen confection, and said scraper means positioned to scrape said frozen confection from said surface during each movement of the traveller member in the other direction along said path.

2. Apparatus for making a frozen confection from a flavoured liquid medium, comprising a piston member mounted for reciprocal movement, a sprayer mounted at a first face of the piston, means connected to the second face of the piston and communicating with said sprayer, for discharging said flavoured liquid medium under pressure in response to the movement of the piston in the direction faced by said second face, a cylinder surrounding said piston and internally defining a collector surface for a layer of said liquid medium discharged as a spray by said sprayer, means for refrigerating said collector surface to convert said layer of liquid medium into a frozen confection, and a scraper edge provided on the periphery of said first face of the piston for scraping said frozen confection from the collector surface during movement of the piston in the direction faced by said first face.

3. Apparatus as claimed in claim 2, wherein the first face of said piston is concave and formed at the peripheral region with a shallow continuous circumferential recess, the outer edge of said recess forming said scraper edge and the recess serving as a deflector for frozen confection removed from the collector surface by said scraper edge, with said sprayer being adapted to produce a coniform radial discharge onto the collector surface immediately adjacent to said outer edge.

4. Apparatus as claimed in claim 2, wherein said piston is provided with a threaded axial bore, and wherein said sprayer is provided on a threaded plug assembly engageable in said base, said plug assembly comprising an outer threaded tube, an inner tube coaxial with said outer tube having said sprayer secured thereto at the lower end, said inner and outer tubes being separated by thermal insulating material, and a non-return valve provided in said inner tube so as to permit fluid flow only towards said sprayer.

5. Apparatus as claimed in claim 2, wherein said means for discharging flavoured liquid comprises a hollow feed tube mounted in fixed parallel relation to the collector surface and having a first non-return outlet valve at a first end facing the piston, means connected to the second end of said hollow feed tube for supplying thereto a metered quantity of flavoured liquid medium, a feed cylinder mounted on said piston and surrounding said feed tube so as to define with the first end of the feed tube a feed chamber of variable volume, means defining a communicating passage between said chamber and said sprayer and a non-return outlet valve from said chamber located in said communicating passage whereby flavoured liquid medium in said feed tube is drawn into said feed tube during scraping movement of the piston and discharged from said feed chamber through said communicating passage and sprayer during spraying movement of the piston.

6. Apparatus as claimed in claim 5 and further comprising a non-return air inlet valve at the second end of the feed tube for relieving vacuum during withdrawal of said liquid into the feed chamber.

7. Apparatus as claimed in claim 6 wherein said metering means comprises a metering pump and one or more suction control valves each connected to said pump suction, the or each suction control valve having a quick release inlet connector for connection to a stock container of flavoured liquid medium.

8. Apparatus as claimed in claim 7, wherein said metering pump and said one or more suction control valves are electrically operable, with the or each valve being connected electrically in series with said pump whereby electrical operation of a valve causes simultaneous operation of the pump.

9. Apparatus as claimed in claim 8, and further comprising a connecting rod connected to said piston, an electric drive motor, a transmission connected to said electric drive motors to said connecting rod for causing reciprocal movement of the piston, a contact switch located to open upon movement of the piston to a limiting position in the direction faced by said second face, a programming and control unit, and means electrically connecting said suction control valves, electric drive motor and switch, said programming and control unit comprising selector means for actuating the or one of said suction control valves and starting said pump, whereby, upon actuation of a suction control valve, the pump delivers a measured amount of flavoured liquid medium to said feed tube, said programming and control unit then closing said suction control valve and stopping said pump, starting said motor to cause said piston to perform a predetermined number of strokes sufficient to substantially evacuate said feed tube and feed chamber, said strokes being signalled to the programming unit by the contact switch, and stopping said motor at the end of the final stroke in the direction faced by said second face of the piston.

10. Apparatus for making a frozen confection from a flavoured liquid medium, comprising a piston defining a passage extending between the faces thereof, a first face of said piston being concave and having an annular concave recess at the periphery thereof to define a scraper edge and deflector, a sprayer mounted centrally of said first face at the end of said passage and adapted to produce a radial coniform spray, a connecting rod connected at one end to the second face of said piston, a crank disc connected to the other end of the connecting rod, a transmission shaft mounting said crank disc for rotation, an electric motor driving said transmission shaft, a cylinder within which said piston is movable, said cylinder defining internally a collector surface for a layer of said flavoured liquid medium, means for refrigerating said collector surface to convert said flavoured liquid medium into a frozen confection, a feed cylinder mounted on the second face of said piston in axially parallel alignment with said piston and so as to communicate with said passage, a non-return valve in the outlet from said cylinder to said passage, a feed tube fixed in relation to said first mentioned cylinder and formed with a piston head around which said feed cylinder is engageable, said feed tube defining a feed chamber of varying volume with said feed cylinder, a non return valve at the outlet from the feed tube to the feed chamber, a non-return air inlet valve in the feed tube at the end remote from said piston head, a metering pump connected to the end of the feed tube remote from said piston head, and a plurality of suction control valves connected to said metering pump, said suction control valves each including a quick release connector for connection to a stock container of flavoured liquid medium, whereby after said feed tube is charged with flavoured liquid medium by said metering pump, reciprocal movement of said piston causes said medium to be sprayed onto said collector surface, frozen, and the resultant frozen confection to be scraped from the collector surface by said scraper edge.

* * * * *